(12) United States Patent
Poliwoda et al.

(10) Patent No.: US 11,776,127 B2
(45) Date of Patent: Oct. 3, 2023

(54) COMPUTER-IMPLEMENTED METHOD FOR SEGMENTING MEASUREMENT DATA FROM A MEASUREMENT OF AN OBJECT

(71) Applicant: Volume Graphics GmbH, Heidelberg (DE)

(72) Inventors: Christoph Poliwoda, Heidelberg (DE); Sören Schüller, Heidelberg (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 106 days.

(21) Appl. No.: 17/100,628

(22) Filed: Nov. 20, 2020

(65) Prior Publication Data
US 2021/0158530 A1 May 27, 2021

(30) Foreign Application Priority Data
Nov. 21, 2019 (DE) ...................... 10 2019 131 440.2

(51) Int. Cl.
*G06T 7/11* (2017.01)
*G06T 7/187* (2017.01)
(Continued)

(52) U.S. Cl.
CPC ............... *G06T 7/11* (2017.01); *G06T 7/168* (2017.01); *G06T 7/174* (2017.01); *G06T 7/187* (2017.01); *G06T 7/60* (2013.01)

(58) Field of Classification Search
CPC . G06T 7/11; G06T 7/168; G06T 7/174; G06T 7/187; G06T 7/60;
(Continued)

(56) References Cited

U.S. PATENT DOCUMENTS 5,798,518 A 8/1998 Coleman et al.
6,282,349 B1 8/2001 Griffin
(Continued)

FOREIGN PATENT DOCUMENTS

CN 202013442 U 10/2011
CN 204989549 U 1/2016
(Continued)

OTHER PUBLICATIONS

Haitham Shammaa et al., "Creeping Contours: A Multilabel Image Segmentation Method for Extracting Boundary Surfaces of Parts in Volumetric Images", Journal of Computing and Information Science in Engineering, Mar. 2011, vol. 11, pp. 1-9 (Year: 2011).*
(Continued)

*Primary Examiner* — Chan S Park
*Assistant Examiner* — Daniel C Chang
(74) *Attorney, Agent, or Firm* — SoCal IP Law Group LLP; Angelo Gaz (57) ABSTRACT

Described is a method for segmenting measurement data from measurement of an object that has at least one material transition region. The measurement data are used to generate a digital object representation that has the material transition region and a multiplicity of spatially resolved image information items relating to the object. The method may include: determining measurement data that have at least one small structure having an extent which is less than a predefined extent; determining at least two homogeneous regions in the measurement data and/or in the digital object representation, wherein at least one homogeneous regions has a small structure; analysing a local similarity of the multiplicity of spatially resolved image information items; adapting an extent of each homogeneous region until at least one border region is arranged at an expected position of a material
(Continued)

transition region; and segmenting the digital object representation based on the adapted homogeneous regions.

14 Claims, 4 Drawing Sheets

(51) Int. Cl.
*G06T 7/168* (2017.01)
*G06T 7/174* (2017.01)
*G06T 7/60* (2017.01)

(58) Field of Classification Search
CPC . G06T 2207/10081; G06T 2207/30116; G06T 2207/30164; G06T 7/12; G06T 7/10; G06T 2207/10004
See application file for complete search history.

(56) References Cited

U.S. PATENT DOCUMENTS

| | | |
|---|---|---|
| 6,447,537 B1 | 9/2002 | Hartman |
| 7,421,125 B1* | 9/2008 | Rees ...................... G06V 20/00 382/282 |
| 2008/0292169 A1 | 11/2008 | Wang et al. |
| 2020/0004138 A1* | 1/2020 | Budach ..................... G03F 1/84 |
| 2020/0320705 A1* | 10/2020 | Wiemker ............... A61B 6/032 |
| 2021/0110533 A1* | 4/2021 | Viti ........................ G06N 3/082 |

FOREIGN PATENT DOCUMENTS

| | | |
|---|---|---|
| DE | 9013085 U1 | 11/1990 |
| DE | 102006039471 B3 | 3/2008 |
| DE | 10 2015 201 271 A1 | 3/2016 |

OTHER PUBLICATIONS

German Patent Office, Office Action for German Patent Application No. 10 2019 131 440.2, dated Jul. 2, 2020. 4 pages.

German Patent Office, Scan of Certified Priority Document for German Patent Application No. 10 2019 131 440.2 filed Nov. 21, 2019.

Chinese National Intellectual Property AdminisliaLion, First Notification of Office Action for Chinese Application No. 1201880037786. 0, dated Mar. 12, 2021.

* cited by examiner

COMPUTER-IMPLEMENTED METHOD FOR SEGMENTING MEASUREMENT DATA FROM A MEASUREMENT OF AN OBJECT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority to German Patent Application number 10 2019 131 440.2, with the same title, filed Nov. 21, 2019.

The invention relates to a computer-implemented method for segmenting measurement data from a measurement of an object.

For quality assurance in order to determine whether objects which have been produced comply with the desired specifications, these objects are measured and are compared with the desired specifications. In this case, the measurement can be carried out as a dimensional measurement, for example. Dimensional measurements can be carried out, for example, by scanning various points of the surface of the object. Furthermore, it is possible to carry out computer tomographic measurements, for example, wherein the measurement data obtained thereby are analysed. In this case, surfaces inside the objects can also be checked. In this case, the measurement data may be in the form of volume data, for example, or can be converted into volume data. In order to be able to distinguish different regions of the object from one another in the measurement data, the measurement data are segmented into different regions. This is of particular interest, for example, during visualization, reverse engineering, multi-component functional analysis and the simulation of materials and material properties. Furthermore, the measurement data can be preprocessed before carrying out the method. Artefact corrections, for example metal artefact, beam hardening or scattered radiation corrections based on the segmented geometry, and data filters, for example Gaussian or median filters, can be applied to the measurement data, for example.

However, the segmentation of volume data relating to multi-material measurement objects has hitherto not been able to be carried out satisfactorily since specific adaptations of the segmentation algorithms are required for each material transition between two specific materials. For example, when analysing greyscale values, it is necessary to use lower threshold values for detecting material transitions between materials which have comparatively low greyscale values in the measurement data, than for detecting material transitions between materials which have comparatively high greyscale values in the measurement data. Therefore, there are no good prospects of segmenting these volume data on the basis of a global threshold value. In particular, if the measurement data have artefacts or small structures, many algorithms cannot correctly segment the different materials. Furthermore, a correct segmentation does not suffice to provide precise measurement results at all material transitions, that is to say to precisely determine the position of the material transitions.

The object of the invention can therefore be considered that of providing an improved computer-implemented method for segmenting measurement data from a measurement of an object which has small structures, wherein the method provides correct detection of material transitions from the measurement data relating to the object.

Main features of the invention are stated herein.

One aspect of the invention provides a computer-implemented method for segmenting measurement data from a measurement of an object, wherein the object has at least one material transition region, wherein the measurement data are used to generate a digital object representation having the at least one material transition region, wherein the digital object representation has a multiplicity of spatially resolved image information items relating to the object, wherein the method has the following steps of: determining the measurement data, wherein the measurement data have at least one small structure having an extent which is less than a predefined extent; determining at least two homogeneous regions in the measurement data and/or in the digital object representation, wherein at least one of the at least two homogeneous regions has a small structure; analysing a local similarity of the multiplicity of spatially resolved image information items; adapting an extent of each homogeneous region until at least one border region of each homogeneous region is arranged at an expected position of a material transition region; segmenting the digital object representation on the basis of the adapted homogeneous regions.

With the invention, different algorithms are used to segment objects having small structures. In this case, the algorithms examine different forms of representation of the measurement data relating to the object. Using different algorithms with their respective advantages and disadvantages makes it possible to utilize the strengths of the algorithms used in the best possible way. For example, the image information from the measurement data can first of all be analysed using one algorithm, wherein each image information item is compared with the locally adjacent image information items, for example, in order to determine homogeneous regions. This can be referred to as pre-segmentation. Furthermore, this can be advantageously carried out on three-dimensional measurement data, for example. However, two-dimensional measurement data which can also be linked to the three-dimensional measurement data can also be used. Similar image information items are then combined to form a homogeneous region. At least one homogeneous region is determined in this manner. In this case, an algorithm on which the determination of the homogeneous region is based may be inaccurate, with the result that the borders of the homogeneous region do not coincide with the positions of the material transition regions which could border the homogeneous region. A further algorithm can be used to analyse the local similarity of the image information. The analysis of the local similarity can be used to determine regions in which the image information only slightly resembles adjacent image information. These regions can be identified as an expected position of a material transition region. In this case, the expected position may also result, for example, from the desired geometry of the object or from another representation of the measurement data. A border region of the homogeneous region is then adapted by means of a further algorithm, for example by shifting its position. The extent of the homogeneous region can be changed in this case. The position of the border region is adapted until the border region comprises an expected position of a material transition region. Disadvantages of individual algorithms can therefore be compensated for by using further algorithms. In this case, a border region is understood as meaning a section of the homogeneous region which borders the homogeneous region. In this case, the border region may have a predefined border region extent inside the homogeneous region.

In the example, regions having values which exceed a predetermined threshold value for the local similarity can be identified as material transition regions between different material regions in the representation of the local similarity. Regions which are bordered by the material transition regions are then completely assigned to that material which had the greatest proportion of this region after the pre-segmentation. In this case, it may also happen that a closed material transition region is not formed between the material regions. This can be closed, for example, by means of a morphological operation of "closing", in which the relevant material transition regions grow together and small regions in between are removed.

The digital object representation is therefore segmented on the basis of the adapted homogeneous regions between the at least two homogeneous regions. In this case, the determination of the expected positions of a material transition region may have a small search region at the edge of the homogeneous regions in which the material transition regions are searched for. In this case, before the step of segmenting the digital object representation on the basis of the adapted homogeneous regions, which, together with the steps of analysing a local similarity of the multiplicity of spatially resolved image information items and adapting an extent of each homogeneous region until at least one border region of each homogeneous region is arranged at an expected position of a material transition region, can act as main segmentation, for example as comparatively fine segmentation, a pre-segmentation, for example a comparatively rough segmentation, is carried out. The pre-segmentation may comprise, for example, the step of determining at least two homogeneous regions in the measurement data and/or in the digital object representation, wherein at least one of the at least two homogeneous regions has a small structure. In this case, in the subsequent main segmentation, material transition regions between the homogeneous regions can be determined, for example, if the local similarity is reduced. Otherwise, the relevant homogeneous regions are combined. In this case, a material transition region may have, for example, a material surface, two abutting material surfaces, a plurality of material transitions separated by narrow material regions or a transition of the inner structure of an individual material etc. The result of this rough segmentation may be the detection of the extent of homogeneous regions or of regions of a similar texture or of small structures in the homogeneous regions. The step of segmenting the digital object representation on the basis of the adapted homogeneous regions can then be carried out. Small structures in the homogeneous regions can be better detected by the combination of the pre-segmentation and the main segmentation than without this combination.

A small structure may be understood as meaning, for example, a texture or a structure having an extent which is less than a predefined extent. The size of the at least one small structure is determined using the predefined extent. The predefined extent may be predefined by a user or an evaluation rule for the method.

In this case, a homogeneous region is understood as meaning a region which has a consistent material or a consistent material mixture. The image information may be, for example, greyscale values which are obtained from measurement data from a computer tomographic measurement during a dimensional measurement of an object.

Furthermore, regions whose measurement data or image information is/are, for example, between two threshold values, for example an upper and a lower threshold value, that is to say in which the local measurement data are similar or have similar values, that is to say if a local similarity is high, are considered to be homogeneous. The image information relating to a homogeneous region the digital object representation can therefore have greyscale values within a narrow range of greyscale values in one example. In the object, these regions may have a consistent material or a consistent material mixture. The homogeneous regions are therefore not absolutely homogeneous, but rather may have fluctuations within a tolerance. The threshold values may be predefined or may be determined when determining the homogeneous regions. However, the homogeneity of the regions need not be defined by means of the greyscale values. In another example, regions having a fibrous material with a similar fibre orientation may also be considered to be homogeneous even if the greyscale values themselves are not homogeneous in this case. However, the pattern which is defined by the texture which results from the fibres is then homogeneous. The material of a region or of the entire object may be, for example, a mono-material, that is to say the material transitions in the material transition regions may then be in this example transitions between different material structures or a transition from the mono-material to the background.

A material transition region may have, for example, a transition between biological materials, welded seams or regions of different fibre orientation. It is not necessary for the material transition region to have a clear material surface. In a further example, a material transition region can be approximated or represented as a surface both in measurements and in a CAD model.

Furthermore, the at least one material transition region may be a multi-material transition region, for example. The term multi-material relates not only to regions of a plurality of homogeneous individual materials. The presence of fibres or porosities may respectively also specify a separate material region within a mono-material even if the underlying material remains identical. Regions of different properties, in particular in the case of an identical or similar material composition, can also be explicitly interpreted as separate materials. The background of a CT scan, usually the air around the object, may likewise be a material in the measurement data.

That is to say, in addition to the image information representing a background of the object, the object comprises at least two materials in the measurement data for which the material transitions, for example surfaces, are determined.

According to a further example, after the step of determining at least two homogeneous regions in the measurement data and/or in the digital object representation, wherein at least one of the at least two homogeneous regions has a small structure, predefined materials can be assigned to the at least two homogeneous regions.

After the pre-segmentation, the main segmentation or a subsequent optional exact surface determination or exact determination of the positions of the material transition regions on the basis of the expected positions of the material transition regions and the segmented object representation, the method can therefore assign the associated specific material to the individual segmented regions if this has not yet previously taken place, for example as a result of a pre-alignment with a desired geometry, for example a CAD model. If there is no desired geometry, this can be carried out using different methods. The typical greyscale values of the segmented region can be compared, for example, with a list of expected materials and the associated greyscale values or absorption coefficients. Alternatively or additionally, a type of parts catalogue may be available on the basis of the geometry of the segmented region, for example, which catalogue contains geometries which can be compared with the geometry of the region.

According to a further example, provision may be made for the method to have the following further step of: determining a desired image information item from at least one homogeneous region if it is determined in at least one of the steps of the method that this at least one homogeneous region has an extent which is less than a predefined extent.

During the analyses, the situation may arise in which new, small regions which have not yet been assigned to a material are identified. On account of the small size of these regions, it is difficult to determine a, possibly constant, greyscale value level in order to determine the associated material. This is the case, in particular, when the point spread function (PSF) of the recording system is of the same order of magnitude as or is greater than the size of the small region. In this case, the adjacent materials or homogeneous regions influence or distort the greyscale values of the small region. Therefore, in this example, a theoretically correct or undisrupted greyscale value is determined for the small region. This theoretically correct or undisrupted greyscale value is the homogeneous greyscale value which this material would have if it were to occur in a manner undisrupted by adjacent materials. The knowledge of the greyscale values of the adjacent regions when homogeneous, the PSF and/or the geometry of the interface can be used for this purpose, for example. On the basis of this knowledge, it is possible to calculate for example, possibly in a model-based manner, what the correct greyscale value level of the small region would have to be like in order to cause the greyscale value profile occurring in the measurement data. In another example, this theoretically correct or undisrupted greyscale value can be determined by means of mathematical deconvolution. An assignment to the material is now possible with the aid of the theoretically correct or undisrupted greyscale value.

In a further example, a predefined material can be assigned in one of the at least two homogeneous regions on the basis of a topology of the one of the at least two homogeneous regions if it is determined in at least one of the steps of the method that this at least one homogeneous region has an extent which is less than the predefined region extent.

In this case, a material is assigned to new regions by analysing the topology. In this case, the information relating to connected materials in the environment is used. If, for example, a new region has been discovered in a material transition region between two materials, this new region can be assigned to possibly adjoining regions by analysing the topology. The topologies of the new region and of the adjoining regions are examined. The examined topology is used to capture whether there are connections between the new region and the adjoining regions. Sections of the new region which have connections to one of the adjoining regions are assigned to this adjoining region and are connected to the corresponding adjoining region. In this case, the entire new region can also be connected to the corresponding adjoining region. Interfaces between the new region or sections of the new region and adjoining regions can likewise be determined using the examined topology. Adjoining regions which have interfaces to the new region or sections can be excluded for a connection to the new region or its sections. Furthermore, the new region may form a separate homogeneous region if it is certain on account of the examined topology that there are no connections to adjoining regions. This information is therefore used to check whether this region belongs to one of these materials, for example on the basis of a theoretically correct or undisrupted greyscale value level.

Alternatively or additionally, particular regions adjoining the new region may already be excluded since this new region must be a separate region on account of its topology. In a further example, the analysing of the local similarity may be based on a change sequence of the multiplicity of spatially resolved image information items and/or a local variance of the multiplicity of spatially resolved image information items.

If the image information is greyscale values, for example, the change sequence can represent the gradient of the spatially resolved greyscale values. If the homogeneous regions are based on textures, the local variance of the image information, for example, can be used to determine the local similarity. In this case, a gradient representation is preferably the absolute value of the local gradient. They indicate increased values in the vicinity of material transition regions.

Furthermore, before determining at least two homogeneous regions of the digital object representation, the method may also have, for example, the following steps of: aligning a digital representation of a desired geometry with the digital object representation, wherein the determination of at least two homogeneous regions is carried out on the basis of the digital representation of a desired geometry.

The expected positions of the material transition regions, for example, can therefore be gathered from the desired geometry in order to obtain at least a rough prealignment of the measurement data. In this case, the desired geometry may be a CAD model of the object. The regions of the desired geometry or of the CAD model can then be assigned to the corresponding regions of the measurement data. The computer-implemented method can therefore resort to previous knowledge from the desired geometry when determining the position of the material transitions. This can be carried out as part of a pre-segmentation.

Alternatively or additionally, information relating to the geometry of the object from a measurement using another sensor, for example optical methods such as strip light projection, can also be used.

For example, after the step of determining at least two homogeneous regions in the measurement data and/or in the digital object representation, wherein at least one of the at least two homogeneous regions has a small structure, the method may have the step of: creating a label field which defines the homogeneous regions by means of spatially resolved label values in the measurement data and/or the digital object representation, wherein a spatial resolution of the label field is higher than a spatial resolution of the measurement data.

If small structures have to be segmented, for example thin layers of a material between two other materials, the detection reliability can be improved further if the homogeneous regions are adapted to the small structures after the pre-segmentation. In this case, the main segmentation can be carried out, for example, with the aid of a label field which defines the homogeneous regions as individual material regions, for example, which can be bordered by the material transition regions, for example. The label field and the measurement data need not have the same alignment for this purpose. In order to be able to ensure that the material regions can also be adapted in small structures, that is to say small, thin and/or narrow structures for example, the resolution of the label field may be selected to be higher, that is to say finer, than the resolution of the measurement data to be segmented.

A label field assigns a material to a location in the digital object representation. For this purpose, different values or ranges of values of the image information, for example greyscale values, can be assigned. For example, particular ranges which are between two threshold values in each case can be assigned to different materials. At the same time, the homogeneous regions are defined with the assignment. The label field implicitly represents the rough positions of the material transition regions. According to a further example, a distance value of a distance field can be assigned to each label value, wherein the distance value defines the shortest distance to a nearest interface of the relevant homogeneous region. The distance field represents the position of the surface. The definitive material transition regions of the different materials can be stored with subvoxel accuracy with the aid of a single distance field, possibly without a sign. In this case, the distance field can represent or store where surfaces are located. In this case, a label value can also be assigned to a plurality of distance values and can therefore be assigned to different homogeneous regions, for example in overlapping regions of the homogeneous regions. Together with the label field, it is possible to determine, for each region of the surface, what material transition region is involved. This can be indicated by the materials which are represented in an adjacent manner in the label field. Since the label field is often present anyway when determining the surface, a distance field is therefore a particularly efficient possible way of describing or storing this.

In a further example, after the step of determining at least two homogeneous regions in the measurement data and/or in the digital object representation, wherein at least one of the at least two homogeneous regions has a small structure, the method may have the step of: creating a label field which defines the homogeneous regions by means of spatially resolved label values in the measurement data and/or the digital object representation, wherein a spatial resolution of the label field is higher than a spatial resolution of the measurement data at least in predefined regions of the object representation, wherein the spatial resolution of the label field is at most as high as the spatial resolution of the measurement data in the remaining regions of the object representation.

The resolution may vary locally in order to optimize the computing time. The resolution of the label field can be selected to be high at positions at which small structures are assumed. The resolution can remain lower, in principle, in the regions in which no small structures are assumed or no small structures can be arranged. In this case, the assumption may be included in an evaluation rule, for example, can be derived from an analysis of the at least two homogeneous regions, which can also be referred to as pre-segmentation, or can be predefined by a user. Furthermore, the assumption may come, for example, from process data from additive manufacturing, can be derived from empirical values or can be calculated from a simulation of the manufacturing process.

In a further example, the step of determining at least two homogeneous regions may have the following substep of: capturing multiple edges between the at least two homogeneous regions.

Material transition regions can therefore already be analysed with respect to a multiple edge during the pre-segmentation. This analysis may be model-based and makes it possible to identify regions in which there is a multiple edge and therefore a previously undiscovered material region between the two outer materials. This material region can then be taken into account in the pre-segmentation, for example in the label field. In principle, it is also conceivable for even a plurality of further material regions to be identified in a material transition region in this manner. Such multiple edge discovery may be a model-based segmentation which can identify greyscale value transitions in which at least two material transitions are represented in a superimposed manner.

A multiple edge should be understood as meaning an edge region which comprises at least two different surfaces.

After the step of segmenting the digital object representation, the method may also have, for example, the following step of: analysing the image information relating to the determined border regions in order to identify defective sections of the material transition regions in the determined border regions; and correcting the defective sections of the material transition regions of the determined border regions.

After the step of segmenting the digital object representation on the basis of the adapted homogeneous regions, the segmented material transition regions can be analysed in order to identify remaining incorrect segmentations, that is to say defective sections. In this case, the analysis is not still carried out on the basis of the representation of the local similarity, but rather on the basis of the greyscale values themselves. Since the material borders have been determined very accurately in the meantime, it is therefore ensured that the analysis searches at the correct point. This is particularly advantageous. If an incorrect segmentation in the material transition region is identified, the segmentation is corrected. If necessary, new material regions are inserted. In this case too, model-based methods such as the above-mentioned multiple edge discovery can be used.

Furthermore, the method may have the following steps of: capturing at least one inhomogeneous region in the object representation; analysing the spatially resolved image information relating to the at least one inhomogeneous region in order to determine textures in the at least one inhomogeneous region; segmenting the at least one inhomogeneous region.

Particularly in the case of additively manufactured components, small structures, for example textures, are often manufactured. These small structures can be segmented better by capturing the at least one inhomogeneous region in the object representation and analysing the spatially resolved image information relating to the at least one inhomogeneous region in order to determine textures in the at least one inhomogeneous region. An alternative method which differs from the method according to the invention can be used to detect the inhomogeneous regions.

According to a further example, the at least one inhomogeneous region may have measurement data relating to a pulverulent region of the object.

In objects which are produced using additive manufacturing methods, there are often regions having unmelted powder which could be misinterpreted as a fixed geometry of the manufactured object. The combination of steps for detecting small structures and for analysing the texture therefore improves the correctness of the capture of the overall geometry of the additively manufactured object.

The at least one inhomogeneous region can be treated, in further analyses, as a region which has differing properties from a material of the inhomogeneous region.

The regions identified as inhomogeneous regions in the measurement data are treated separately in the further evaluation. In this case, the inhomogeneous regions are treated as separate regions which have differing material properties. The material properties may therefore differ from the properties of the corresponding solid material, for example. In particular, this may also mean that the inhomogeneous regions are assessed as not belonging to the geometry of the object. The inhomogeneous regions are assessed, as it were, as the background to the object since they cannot receive any loads. The further analyses may be, for example, dimensional metrology, a defect analysis or a mechanical simulation.

A further aspect provides a computer program product having instructions which can be executed on a computer and, when executed on a computer, cause the computer to carry out the method according to the preceding description.

Advantages and effects as well as developments of the computer program product result from the advantages and effects as well as developments of the method described above. Reference is therefore made to the preceding description in this respect. A computer program product can be understood as meaning, for example, a data storage medium which stores a computer program element which has instructions which can be executed for a computer. Alternatively or additionally, a computer program product may also be understood as meaning, for example, a permanent or volatile data memory such as a flash memory or a main memory which has the computer program element. However, further types of data memories which have the computer program element are not excluded thereby.

Further features, details and advantages of the invention emerge from the following description of exemplary embodiments on the basis of the drawings, in which.

The computer-implemented method for segmenting measurement data from a measurement of an object is denoted in its entirety below using the reference sign 100. The computer-implemented method 100 is first of all explained by means of FIG. 1.

Figure 1:
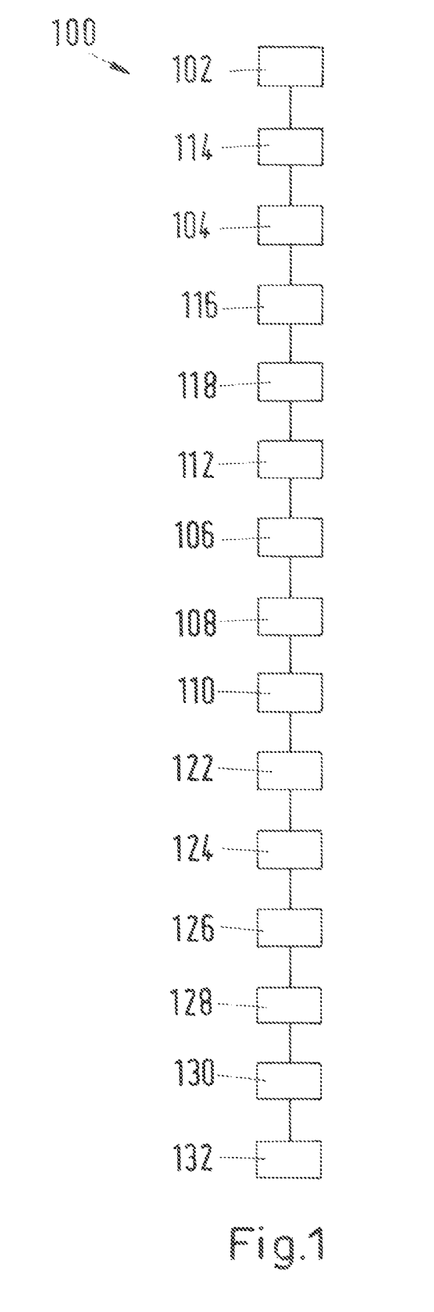
FIG. 1 shows a flowchart of the computer-implemented method.

FIG. 1 shows a flowchart of an embodiment of the computer-implemented method 100 for segmenting measurement data from a measurement of an object. In this case, the object has at least one material transition region. Furthermore, the measurement data comprise at least one small structure having an extent which is less than a predefined extent. In this case, the predefined extent may be predefined, for example, by a user or an evaluation rule. Furthermore, the predefined extent may be determined, for example, by simulating the production of the object.

In a first step 102, the measurement data relating to the object are determined. In this case, the measurement data can be determined, for example, by means of a computer tomographic (CT) measurement. However, other methods for determining the measurement data, for example magnetic resonance tomography etc., are not excluded thereby. The measurement data are used to generate a digital object representation having the at least one material transition region. The digital object representation comprises a multiplicity of spatially resolved image information items relating to the object.

If the measurement data are CT data, they need not necessarily consist of only a single greyscale value per voxel. They may be multimodal data, that is to say data from a plurality of sensors, or data from a multi-energy CT scan, with the result that a plurality of greyscale values are present for each voxel. Furthermore, results from analyses on the original measurement data can also be used as a further spatially resolved greyscale value in the method 100, for example the result of an analysis of the fibre orientation or of the local porosity. The additional information, which can be referred to as colour channels for example, can therefore be interpreted like coloured voxel data even though no colours of the visible spectrum are represented. This additional information can be advantageously used in the method 100.

In an optional step 114, a digital representation of a desired geometry of the object is aligned with the digital object representation from the determined measurement data according to step 102. The digital representation of a desired geometry of the object may be, for example, a CAD representation of the object which was created before producing the object. The geometry in the CAD model need not necessarily be described as a surface or material transition region. Instead or additionally, it may also be implicitly represented as a stack of images, a voxel volume or a distance field. This can be used during additive manufacturing, in particular. Furthermore, this information can be converted into a label field directly and without complicated conversion. However, further forms of representation of the desired geometry are not excluded thereby.

At least two homogeneous regions are determined in the measurement data and/or in the digital object representation on the basis of the digital representation of the desired geometry. Since the material transition regions and the components of the object or the regions of the object having homogeneous materials are known in the digital representation of the desired geometry, homogeneous regions in the measurement data or in the digital object representation which is generated from the measurement data can be inferred from the digital representation of the desired geometry after the alignment in step 114.

During the alignment, that is to say when adapting the geometric regions of the desired geometry to the measurement data, it is possible to take into account which materials are involved in the greyscale value transition and how they are arranged. The orientation of the material transition can emerge from the arrangement of the materials. This information is usually known in the desired geometry and can be locally easily determined from the measurement data in each case. This makes it possible to prevent material transition regions which do not match one another from being assigned to one another, which would result in incorrect alignment.

The alignment can also be carried out by means of a non-rigid mapping between the measurement data and the desired geometry.

In a further step 104, at least two homogeneous regions are determined in the measurement data and/or in the digital object representation. For this purpose, the image information is analysed in order to determine whether there are homogeneous regions, for example regions within a range of greyscale values or with a similar texture. At least one of the at least two homogeneous regions has a small structure in this case. All homogeneous regions may also have small structures.

In an optional step 116, a label field, which defines the homogeneous regions by means of spatially resolved label values in the measurement data and/or the digital object representation, can be created for the determined homogeneous regions. In this case, a spatial resolution of the label field is higher than a spatial resolution of the measurement data. That is to say, the label field can be defined with subvoxel accuracy, for example. Furthermore, the resolution may vary locally in order to optimize the computing time. The resolution of the label field can be selected to be high at positions at which small structures are assumed. The resolution may remain lower, in principle, in the regions in which no small structures are assumed or no small structures can be arranged.

In a further optional step 118, a label field, which defines the homogeneous regions by means of spatially resolved label values in the measurement data and/or the digital object representation, can be created during an optional pre-segmentation.

The label field can be combined with a distance field with or without a sign. In this case, at least one distance value of the distance field is assigned to each label value. In this case, a distance value describes the distance to a nearest interface of the homogeneous region. A separate distance field can be created for each material.

The interfaces of the homogeneous region are arranged in the material transition regions. In this case, a label value can be assigned to a plurality of distance fields and can therefore be assigned to a plurality of distance values. That is to say, the material transition regions for each material in an object can each be represented by a separate distance field. The size of a homogeneous region can be recorded with little memory use and with little computing effort using a distance field.

In this case, it is possible to use previous knowledge which indicates, for example, that, of a particular material in the object, only contiguous regions of a volume of a specific size can occur in the measurement region. This can be taken into account when creating the label field by virtue of a contiguous region which is larger then not being assigned to this material. This reduces errors during segmentation.

For example, screws of a certain maximum size may be present in the measurement region. If a larger region is assigned to this material by the method at a point in the measurement volume, it can be determined in this manner that the assignment was presumably incorrect.

An alignment or registering with the desired geometry, for example a CAD model, can be carried out in principle in such a manner that material transition regions from the measurement are adapted to the corresponding material transition regions of the desired geometry. That is to say, that pose at which they match in the best possible manner is searched for. In this case, particular features of the geometries such as corners and edges can also be explicitly identified in order to find a suitable assignment. In this case, the user or the evaluation rule can select which materials, material transitions or components of the desired geometry should be taken into account and which should not. In addition, with the knowledge of the type of transition in the measurement data, an incorrect assignment and therefore incorrect registering can be prevented.

Any registering, for example between the measurement data and the desired geometry, can also be carried out in a non-rigid manner.

Furthermore, when creating a label field, the measurement data can be searched for known geometry elements, for example a screw, from a database. If a geometry element or a geometry element which is similar within predefined limits is identified in the measurement volume, the knowledge of the desired geometry can be used in the further evaluation by assigning the corresponding material label to the ranges of greyscale value in the pre-segmentation, for example, or adapting the associated desired geometry to the geometry element. Furthermore, alternatively or additionally, a corresponding evaluation plan can be automatically called up. In a further example, the object can be automatically identified or named in a scene tree. The search for known geometry elements from a database can also be carried out in further steps of the method 100.

In a further optional step 112, specific materials can be assigned to the homogeneous regions by analysing, for example, the image information, which is associated with the regions and may be in the form of greyscale values, in the original measurement data. In this case, at least one of the at least two homogeneous regions has a small structure.

In a step 106, the local similarity of the multiplicity of spatially resolved image information items is analysed. In this case, a change sequence of the multiplicity of spatially resolved image information items can be analysed, for example. Alternatively or additionally, a local variance of the multiplicity of spatially resolved image information items can be analysed. The local variance can be calculated more quickly and more robustly at multi-material transition regions than the use of change sequences. Expected positions of the material transition regions between different components of the object can be determined from the local similarity. These expected positions of the material transition regions are the positions of expected borders of the homogeneous regions determined in step 104.

In a further step 108, the homogeneous regions are then adapted. For this purpose, the extent of each homogeneous region is changed, with the result that a border region of each homogeneous region is arranged at the expected position of a material transition region. The expected positions of the material transition regions therefore border the homogeneous regions in the object representation.

In a further step 110, at least two homogeneous regions from the digital object representation are segmented. Step 110, together with steps 106 and 108, can be referred to as main segmentation. In this case, determined homogeneous regions in the digital object representation are adapted and delimited from one another.

In step 110, information from other sensors can be used. When adapting the position of the material transition regions, the surface information obtained with these sensors is used to extend the material transition regions in this direction or to prevent material transition regions from being extended beyond the surfaces determined in this manner.

In an optional step 122, a desired image information item can then be determined from at least one homogeneous region if it is determined in at least one of the steps of the method that this at least one homogeneous region has an extent which is less than a predefined region extent. In this case, the topology can be analysed in the case of newly determined regions. In this case, the image information in the new region is analysed and is examined, for example, in order to determine the regions in which greyscale values are located, for example, or whether particular textures can be detected. A material can be assigned to the new region by analysing the topology. In this case, the information relating to connected materials in the environment is used, that is to say the topology of the regions can be used, to assign the material in the new region to an adjoining region.

In a further optional step 124, the image information relating to the determined border regions can be analysed in order to identify defective sections of the material transition regions in the determined border regions. The exact positions of the material transition regions have been determined in this case in the segmentation in step 110. The exact positions of the material transition regions are used to ensure that the analysis of the image information in step 124 searches for surfaces at the correct location. If it is determined that an incorrect segmentation has taken place in step 110, that is to say the incorrect positions in step 110 have been determined for the sections of the material transition regions in step 124, these are found with a high degree of probability in step 124. Multiple edge discovery methods or other model-based methods can be used for this purpose, for example.

In a further optional step 126, the defective sections of the material transition regions of the determined border regions can be corrected after step 124. New material regions are introduced for this purpose, for example if it is determined in step 124 that a separate new region is arranged within a previously incorrectly segmented section of a material region.

In a further optional step 128, an inhomogeneous region can be captured in the object representation, that is to say in the measurement data. Inhomogeneous regions may arise in the produced objects during additive manufacturing methods, for example, if powder has not been correctly melted or has been only partially melted during the additive manufacturing, for example. In this manner, an object may have powder inclusions which form inhomogeneous regions within the object in the measurement data. These inhomogeneous regions generally form small structures which can be arranged as small structures in the homogeneous regions.

In a further optional step 130, the spatially resolved image information relating to the at least one inhomogeneous region can be analysed. This is carried out in order to determine textures in the at least one inhomogeneous region. In particular, if the inhomogeneous region has unmelted powder, the inhomogeneous region may instead have textures based on the granulation of the powder. Textures may also arise as a result of fibres in a material which is represented by the inhomogeneous region.

In a further optional step 132, the at least one inhomogeneous region is segmented. In this case, the inhomogeneous region is delimited from the surrounding homogeneous regions or possibly from further inhomogeneous regions. In this case, a material can be assigned to the inhomogeneous region, precisely like in step 110, wherein the assignment is based on the image information in the inhomogeneous region.

Figure 2:
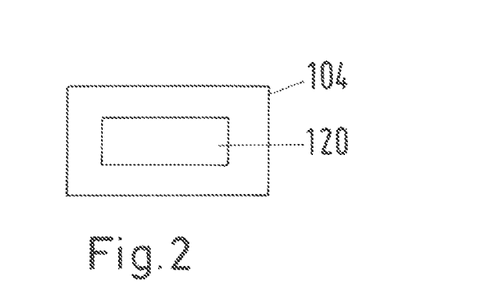
FIG. 2 shows a flowchart with substeps of an exemplary embodiment of the determining step.

FIG. 2 illustrates an optional substep 120 of step 104. In this case, substep 120 comprises capturing multiple edges between the at least two homogeneous regions.

Figure 3:
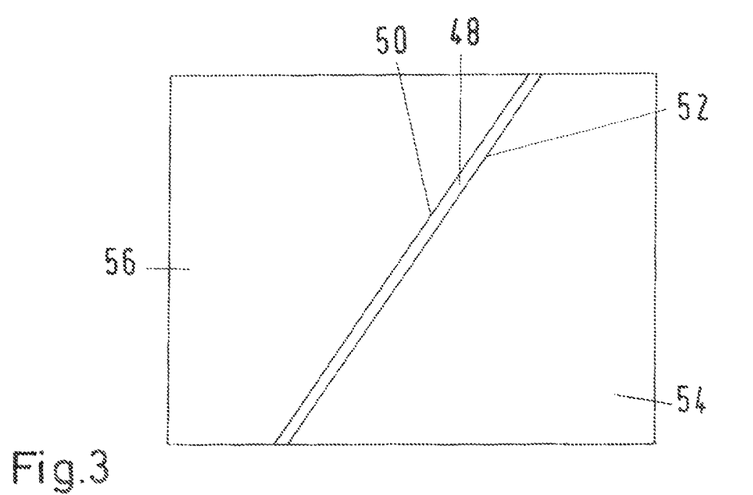
FIG. 3 shows a schematic illustration of a multi-material transition region.

FIG. 3 shows an example of a multi-material transition region having multiple edges. In this case, the materials 48, 54 and 56 are illustrated in FIG. 3. In this case, the material 48 is arranged between the materials 54 and 56 and has a very short extent in comparison with the other two materials. The material transition region 52 is arranged between the material 48 and the material 54. The material transition region 50 is arranged between the material 48 and the material 56. Overall, the two material transition regions 50 and 52 form a multi-material transition region which can be resolved only with difficulty using conventional methods. Conventional segmentation methods generally detect such regions as merely one material transition region. However, a plurality of material transition regions which are very close together can be detected using the computer-implemented method 100 of the invention described above.

Figure 4A:
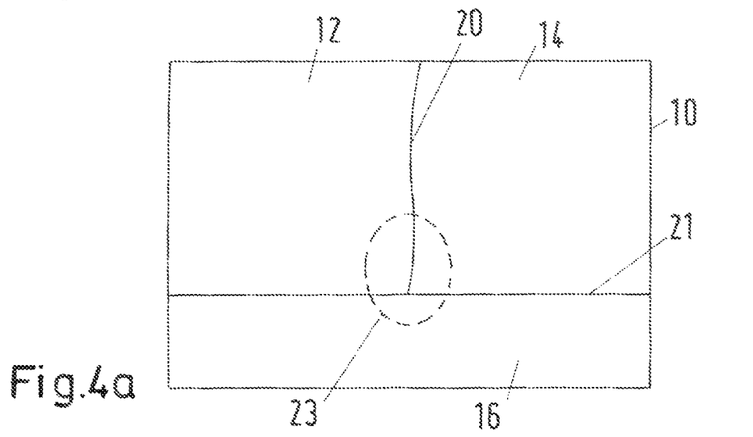
FIGS. 4a, b show a schematic illustration of material transitions before and after creating a new region.
Figure 4B:
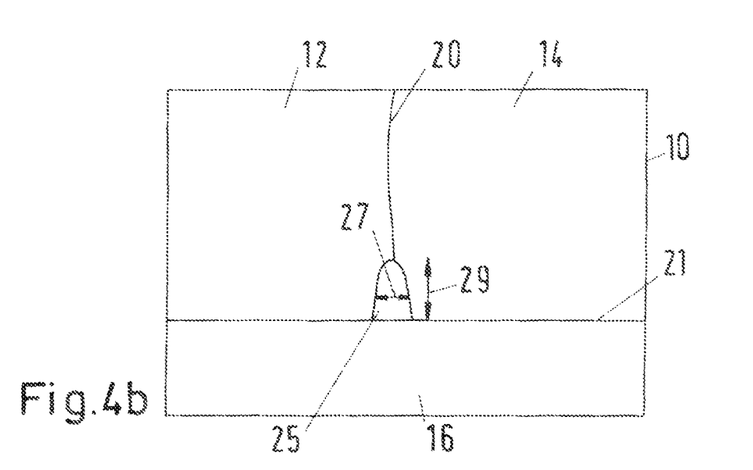

FIGS. 4a and 4b explain the optional step 112, already explained above, in more detail. A digital representation 10 of image information, which shows a sectional image through an object, is illustrated here. In this case, the object has the subregions 12, 14 and 16. The subregion 12 is delimited from the subregion 14 by the material transition region 20 in FIG. 4a. The subregion 16 is delimited from the subregions 12 and 14 by the material transition region 21.

A small structure is arranged in the region 23 depicted using the dashed line, but is not resolved in FIG. 4a and is accordingly not represented.

The region 23 and the subregions 12, 14 and 16 are analysed by examining the topology. In this example, the analysis reveals that the region 23 is separated from the subregions 12, 14 and 16. According to FIG. 4b, a new region is therefore formed as subregion 25 which is arranged between the subregions 12, 14 and 16. In this case, the new region represents a small structure which has an extent 27 and 29 which are both less than a predefined extent.

Alternatively, the new region can be combined with one of the subregions 12, 14, 16 if the analysis of the topology reveals that the region 23 is connected to one or more of the subregions 12, 14 and 16. The new region may also be distributed among a plurality of subregions. In this case, parts of the new region 25 are distributed among the subregions 12, 14 and/or 16.

Figure 5A:
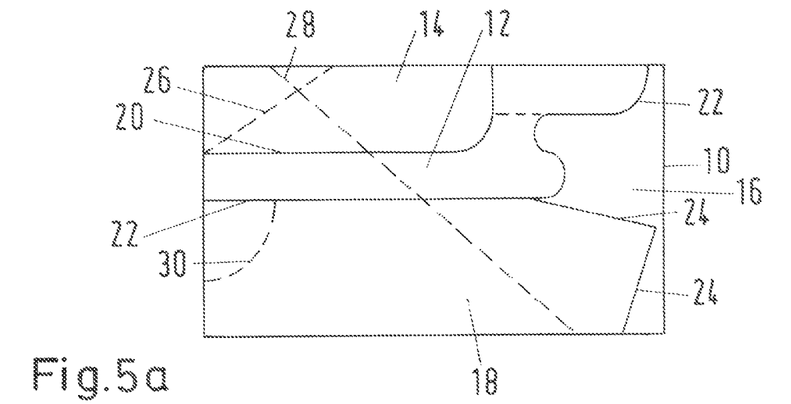
FIGS. 5a-e show a schematic illustration of a sequence of steps of an exemplary embodiment of the method.

The optional steps 116 and 118 and some further steps of the method 100 are explained in more detail below using FIGS. 5a to 5e which illustrate a use of a label field in connection with the method 100. In this case, FIG. 5a schematically shows a digital representation 10 of image information from measurement data relating to a section of an object. This schematic digital object representation may be, for example, a sectional representation of a computer tomographic measurement. In this case, the image information may be greyscale values which, for reasons of clarity, are not illustrated as greyscale values in FIG. 5a. Only transition regions in which the greyscale values change greatly are illustrated as lines.

The object has the subregions 12, 14, 16 and 18, the image information of which respectively forms homogeneous regions. The subregion 12 is delimited from the subregion 14 by means of the material transition region 20. The subregion 12 is delimited from the subregions 16 and 18 by means of the material transition region 22. The material transition region 24 is arranged between the subregion 16 and the subregion 18. However, in the digital representation 10 of the image information, the transition regions 26, 28 and 30 can also be seen, but result from shadowing or other artefacts and are not material transition regions.

In this case, conventional algorithms have problems with distinguishing the transition regions 26, 28 and 30 from material transition regions 20, 22 and 24. Therefore, it is possible to initially carry out an optional pre-segmentation in which the image information is analysed.

Figure 5B:
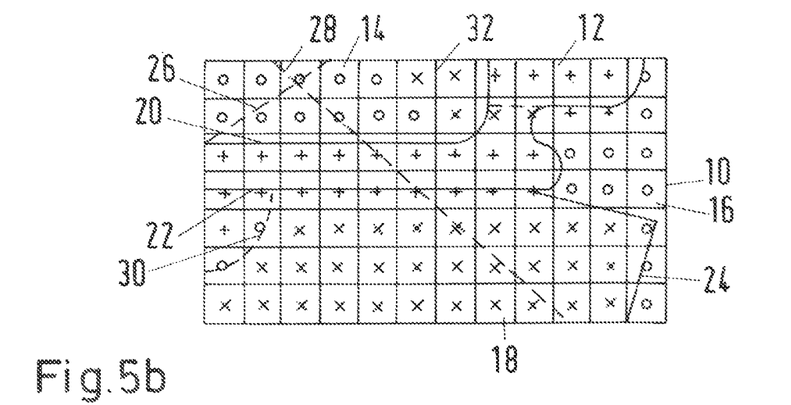

In this case, FIG. 5b illustrates the representation 10 of the image information from FIG. 5a with a grid as a label field 32. The label field 32 may have any desired resolution and may be, for example, rougher than the resolution of the voxels or pixels, may have voxel/pixel accuracy or subvoxel/subpixel accuracy. The label field 32 and/or the distance field will in most cases have the same structure and resolution as the measurement data. However, a lower resolution and therefore larger cells, or an anisotropic resolution and therefore cuboids instead of cubes, can be selected, for example. Furthermore, the structure can also be adapted, for example tetrahedrons instead of cubes. In addition, it is not absolutely necessary to make it possible to represent the material transition regions with subvoxel accuracy with the aid of one or more distance fields. This may become necessary only when or after determining the position of the material transition regions. Therefore, computing time and storage space can be saved if work is carried out only on the label field during segmentation and distance fields are used only when determining the positions of the material transition regions.

If the image information is greyscale values, for example, greyscale values below a certain threshold value can be assigned to a first material, for example air, which is indicated with the label "o" in FIG. 5b. Greyscale values above a further threshold value are assigned to a second material which is illustrated with the label "+" in FIG. 5b. Greyscale values which are between the two threshold values can be assigned to a third material which is indicated with the "x" in FIG. 5b.

The label field can be combined with a distance field.

Furthermore, the information from the desired geometry relating to the individual parts of the object, for example in the case of connectors having numbered pins 1-9, can be used to obtain information relating to the respective materials. Therefore, regions of the same material can also be divided among different parts of the object. In this manner, the practice of evaluating the measurement data becomes clearer. Ideally, the regions are listed or indicated in a hierarchical structure already defined in the desired geometry.

In a similar manner, the regions of the same material which are separated or are not connected in the label field can also be automatically divided into different parts.

Figure 5C:
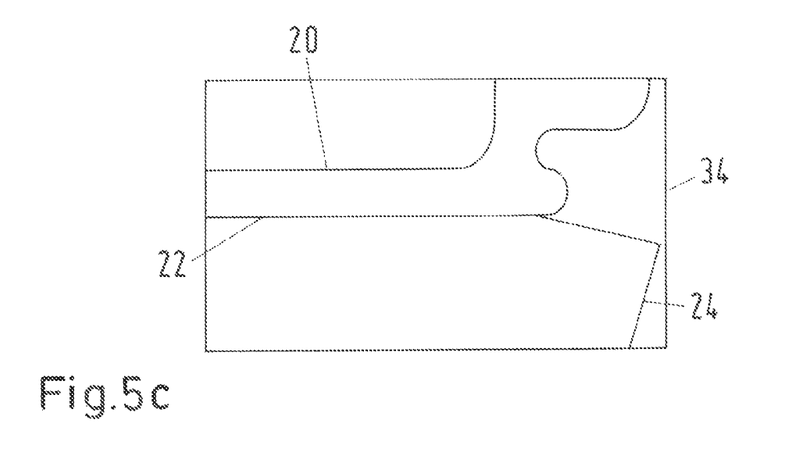

In a next step according to FIG. 5c, a representation 34 which is obtained from analysing the local similarity of the image information is determined. This may be a gradient representation, for example. Here, the material transition regions 20 and 22 and 24 are clearly discernible. The transition regions 26 to 30 cannot be seen in this representation. However, in contrast to the representation 10 of the image information, the individual subregions of the object cannot be qualitatively distinguished from one another. That is to say, the material of a subregion cannot be inferred from the representation according to FIG. 5c.

Figure 5D:
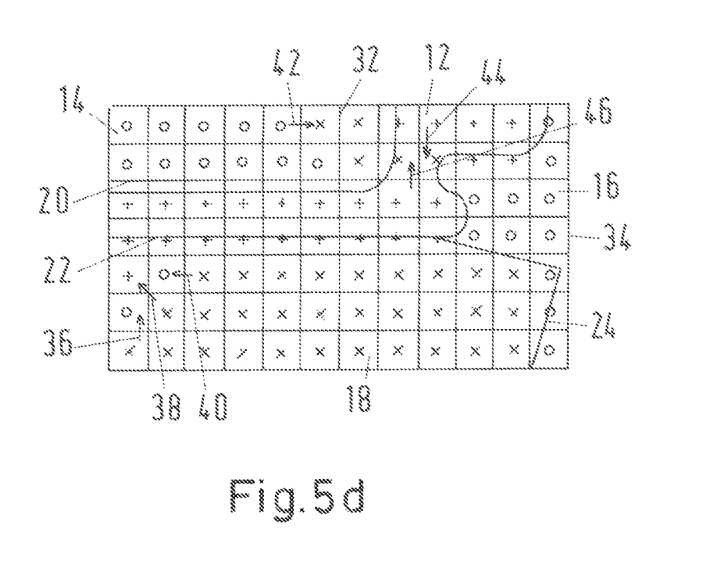

The representation 34 is linked to the label field 32, as is illustrated by way of example in FIG. 5d. In this case, it becomes discernible that the homogeneous regions are not bordered by the material transition regions 20, 22 and 24 in all sections. The borders of the homogeneous regions are therefore shifted during a main segmentation by relabelling homogeneous regions, for example from "o" to "x" at the arrows 36 and 40 and from "+" to "x" at the arrow 38. The region which has the label "o" at the arrows 36 and 40 has disappeared in FIG. 5e and now belongs to the region with the label "x". The region with the label "+" was reduced at the arrow 38 and the region with the label "o" was increased. A similar process takes place at the arrows 42, 44 and 46. At the arrows 46 and 44, two previously separate homogeneous regions with the label "+" grow together, wherein a region with the label "x" disappears.

Alternatively or additionally, individual regions which belong to a material can be marked in the digital object representation in order to create the label field. The marking is intelligently automatically extended to the next material transition region. It is also possible to allow a material transition region to be indicated by a user and to be automatically increased until the material transition region collides with other material transition regions, for example, with the result that the user is not forced to indicate a complete material transition region. Accurate marking is therefore not necessary. Furthermore, operations such as opening, closing, erosion and dilatation, an inversion, Boolean operators or smoothing tools such as filters can be used to process the regions in the label field.

Furthermore, it is possible to highlight regions in which material transition regions are present in a user's opinion. In this case, anchor points can be set, wherein the processing can be carried out as a material transition region and, as it were, as meta-information, or the image information is directly changed in the representation of the local similarity.

Alternatively, defective material transition regions can also be removed or weakened. After processing, the label field is recalculated on this basis. In this case, it is also possible to output a warning if no meaningful material transition region can be found at the location defined by the user.

A surface-based determination of a local data quality can also be used. In this case, a quality value representing the accuracy of the material transition region can be assigned to each material transition region.

The representation of the local similarity can be calculated from the measurement data, in particular from volume data, using different methods. For example, a Sobel operator, a Laplace filter or a Canny algorithm can be used. The choice of which algorithm is used and how it is parameterized can be manually made by the user. For example, that algorithm which produces the best results when creating the label field can be selected on the basis of a preview image. In addition, the representation of the local similarity can be processed by means of filtering before adapting the label field in order to achieve the best possible results. An example would be the use of a Gaussian filter in order to minimize the negative influence of noise on the result when adapting the label field.

Depending on the algorithm, it is possible for even smaller regions to be incorrectly segmented after the label field has been adapted. In order to rectify this, substeps can optionally also be carried out.

In this case, morphological operators such as opening and/or closing can be applied to the individual material regions, thus removing small regions.

Furthermore, contiguous regions below a defined maximum size can be deleted and can be assigned to the surrounding material(s). Regions which are surrounded by two or more other materials can optionally be provided with a differing or larger maximum size is or cannot be deleted at all, whereas regions which are surrounded only by one other material are still treated with the above-mentioned maximum size. In this manner, thin layers of a material between two further materials can be retained, for example.

Figure 5E:
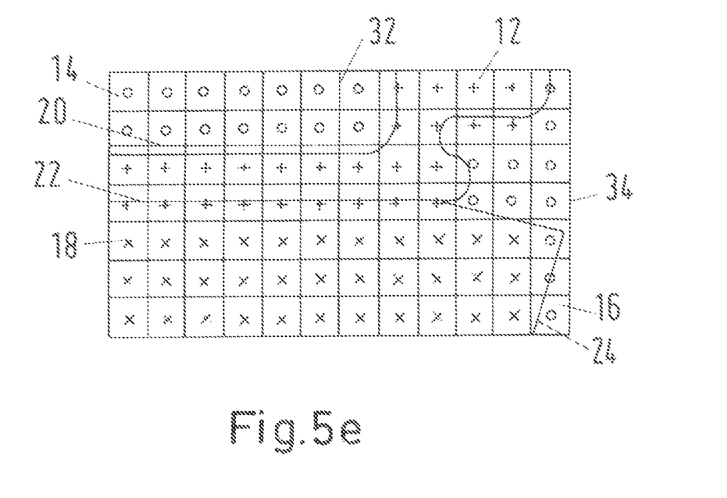

FIG. 5e shows the result of the main segmentation. Here, the borders of the label fields correspond approximately to the material transition regions 20, 22 and 24. The components or materials 12, 14 and 16 are therefore segmented.

The material transition regions which can represent a local surface, for example, are calculated with greater accuracy on the basis of the adapted label field. A further algorithm specialized for this can be used for this purpose. In this case, the exact position of the material transition region is searched for in a small surrounding area, for example a few voxels. This is usually the prerequisite for exact dimensional measurements which are intended to be carried out on CT data.

Different algorithms may, in principle, be used for this purpose, for example algorithms which work directly on the measurement data. They can determine the local position of the surface, for example by means of a local or global threshold value or by searching for the maximum gradient or for a turning point of the greyscale value profile.

Furthermore, the exact local position of the material transition regions can be determined, for example, in the representation of the local similarity or the gradient or variance representation by adapting a second-degree polynomial to the greyscale value profile, for example. The position of the extremum of this polynomial can be used as the position of the surface.

However, further algorithms are not excluded by the explanations stated above.

The knowledge of the, possibly approximate, direction of a surface normal, of a surface arranged in the material transition region or of the materials arranged in the material transition region can be derived from the label field and the representation implicitly stored therein. This knowledge can be used by some algorithms to achieve more exact results. This knowledge, if available, can also be alternatively gathered from the desired geometry, for example a CAD model.

This is then carried out in combination with an algorithm which requires or can use the information relating to a starting surface to calculate the exact position of the surface on the basis thereof.

Furthermore, cone beam artefacts, sampling artefacts and noise can be reduced before or after creating the label field.

The invention is not restricted to one of the embodiments described above, but rather can be modified in various ways.

All of the features and advantages emerging from the description and the drawing, including design details, spatial arrangements and method steps, can be essential to the invention both alone and in the wide variety of combinations.

The invention claimed is:

1. Computer-implemented method for segmenting measurement data from a measurement of an object, wherein the object has at least one material transition region, wherein the measurement data are used to generate a digital object representation having the at least one material transition region, wherein the digital object representation has a multiplicity of spatially resolved image information items relating to the object, wherein the method has the following steps of:
   determining the measurement data, wherein the measurement data have at least one small structure having an extent which is less than a predefined extent;
   aligning a digital representation of a desired geometry with the digital object representation;
   determining at least two homogeneous regions in the measurement data and/or in the digital object representation, wherein at least one of the at least two homogeneous regions has a small structure, wherein the determination of at least two homogeneous regions is carried out on the basis of the digital representation of a desired geometry;
   analysing a local similarity of the multiplicity of spatially resolved image information items;
   adapting an extent of each homogeneous region until at least one border region of each homogeneous region is arranged at an expected position of a material transition region; and
   segmenting the digital object representation on the basis of the adapted homogeneous regions.

2. Method according to claim 1, characterized in that the at least one material transition region is a multi-material transition region.

3. Method according to claim 1, characterized in that, after the step of determining at least two homogeneous regions in the measurement data and/or in the digital object representation, wherein at least one of the at least two homogeneous regions has a small structure, predefined materials are assigned to the at least two homogeneous regions.

4. Method according to claim 3, characterized in that a predefined material is assigned to one of the at least two homogeneous regions on the basis of a topology of the one of the at least two homogeneous regions if it is determined in at least one of the steps of the method that this at least one homogeneous region has an extent which is less than the predefined extent.

5. Method according to claim 1, characterized in that the analysing of the local similarity is based on a change sequence of the multiplicity of spatially resolved image information items and/or a local variance of the multiplicity of spatially resolved image information items.

6. Method according to claim 1, characterized in that, after the step of determining at least two homogeneous regions in the measurement data and/or in the digital object representation, wherein at least one of the at least two homogeneous regions has a small structure, the method has the following step of:
   creating a label field which defines the homogeneous regions by means of spatially resolved label values in the measurement data and/or the digital object representation;
wherein a spatial resolution of the label field is higher than a spatial resolution of the measurement data.

7. Computer-implemented method for segmenting measurement data from a measurement of an object, wherein the object has at least one material transition region, wherein the measurement data are used to generate a digital object representation having the at least one material transition region, wherein the digital object representation has a multiplicity of spatially resolved image information items relating to the object, wherein the method has the following steps of:
   determining the measurement data, wherein the measurement data have at least one small structure having an extent which is less than a predefined extent;
   determining at least two homogeneous regions in the measurement data and/or in the digital object representation, wherein at least one of the at least two homogeneous regions has a small structure;
   creating a label field which defines the homogeneous regions by means of spatially resolved label values in the measurement data and/or the digital object representation;

wherein a spatial resolution of the label field is higher than a spatial resolution of the measurement data at least in predefined regions of the object representation,
wherein the spatial resolution of the label field is at most as high as the spatial resolution of the measurement data in the remaining regions of the object representation;

analysing a local similarity of the multiplicity of spatially resolved image information items;

adapting an extent of each homogeneous region until at least one border region of each homogeneous region is arranged at an expected position of a material transition region; and segmenting the digital object representation on the basis of the adapted homogeneous regions.

8. Method according to claim 1, characterized in that the step of determining at least two homogeneous regions has the following substep of:

capturing multiple edges between the at least two homogeneous regions.

9. Method according to claim 1, characterized in that the method has the following further step of:

determining a desired image information item from at least one homogeneous region if it is determined in at least one of the steps of the method that this at least one homogeneous region has an extent which is less than a predefined region extent.

10. Method according to claim 1, characterized in that, after the step of segmenting the digital object representation, the method also has the following step of:

analysing the image information relating to the determined border regions in order to identify defective sections of the material transition regions in the determined border regions; and correcting the defective sections of the material transition regions of the determined border regions.

11. Computer-implemented method for segmenting measurement data from a measurement of an object, wherein the object has at least one material transition region, wherein the measurement data are used to generate a digital object representation having the at least one material transition region, wherein the digital object representation has a multiplicity of spatially resolved image information items relating to the object, wherein the method has the following steps of:

determining the measurement data, wherein the measurement data have at least one small structure having an extent which is less than a predefined extent;

determining at least two homogeneous regions in the measurement data and/or in the digital object representation, wherein at least one of the at least two homogeneous regions has a small structure;

analysing a local similarity of the multiplicity of spatially resolved image information items;

adapting an extent of each homogeneous region until at least one border region of each homogeneous region is arranged at an expected position of a material transition region;

segmenting the digital object representation on the basis of the adapted homogeneous regions;

capturing at least one inhomogeneous region in the object representation;

analysing the spatially resolved image information relating to the at least one inhomogeneous region in order to determine textures in the at least one inhomogeneous region; and segmenting the at least one inhomogeneous region.

12. Method according to claim 11, characterized in that the at least one inhomogeneous region has measurement data relating to a pulverulent region of the object.

13. Method according to claim 11, characterized in that the at least one inhomogeneous region is treated, in further analyses, as a region which has differing properties from a material of the inhomogeneous region.

14. A non-transitory computer program product having instructions which can be executed on a computer and, when executed on a computer, cause the computer to carry out the method according to claim 1.

* * * * *